United States Patent [19]

Thompson

[11] 4,368,019
[45] Jan. 11, 1983

[54] COMPACT DOUGH DIVIDER AND FORMING MACHINE

[76] Inventor: Daniel T. Thompson, 1141 Napoli Dr., Pacific Palisades, Calif. 90272

[21] Appl. No.: 307,508

[22] Filed: Oct. 1, 1981

Related U.S. Application Data

[63] Continuation-in-part of Ser. No. 183,187, Sep. 2, 1980, Pat. No. 4,336,010.

[51] Int. Cl.³ .................. A21C 11/10; A21C 7/06; B29C 15/00
[52] U.S. Cl. .................. 425/141; 425/144; 425/232; 425/233; 425/288; 425/297; 425/327; 425/364 B
[58] Field of Search ............... 425/140, 141, 363, 289, 425/308, 364 B, 296, 297, 232, 182, 194, 225, 144, 241, 327, 288, 305.1, 116, 233

[56] References Cited

U.S. PATENT DOCUMENTS

| | | | |
|---|---|---|---|
| Re. 25,536 | 3/1964 | Thompson | 425/364 B |
| 1,839,180 | 12/1931 | Bergner | 425/190 |
| 2,126,416 | 8/1938 | Schlicter | 425/288 |
| 2,779,298 | 1/1957 | Chwirut et al. | 425/288 |
| 3,052,196 | 9/1962 | Gilmore | 425/288 |
| 3,379,142 | 4/1968 | Reter et al. | 425/237 |
| 3,433,182 | 3/1969 | Thompson | 425/305.1 |
| 3,452,687 | 7/1969 | Kaneko et al. | 425/116 |
| 3,476,058 | 11/1969 | Watkin et al. | 425/141 |
| 3,517,622 | 6/1970 | Schneider et al. | 425/233 |
| 3,792,940 | 2/1974 | Thompson | 425/296 |
| 3,986,446 | 10/1976 | Thompson et al. | 99/485 |
| 4,147,809 | 4/1979 | Thompson | 426/499 |
| 4,218,207 | 8/1980 | Thompson | 425/241 |

FOREIGN PATENT DOCUMENTS 239890 of 0000 U.S.S.R. .

Primary Examiner—Willard E. Hoag
Attorney, Agent, or Firm—Poms, Smith, Lande & Rose

[57] ABSTRACT

A dough receiving, shaping, dividing and forming machine for making dough bodies of predetermined size and configuration from an initially unshaped batch of dough in a continuous manner in a single machine frame has an infeed conveyor for receiving a batch of unshaped dough and conveying it to a preshaping location, a pair of laterally spaced dough batch side roller shaping rollers at said preshaping side bath into a uniform width, a pair of verticaly shaped top and bottom roller preshaping and dough advancing rollers for preshaping said batch into a uniform height and advancing said batch from between said side shaping means to a divider location, dough divider means at the divider location for receiving the dough batch in a preshaped configuration, shaping it to two generally rectangular cross section strips of dough and advancing the strips to a cut-off location, dough cut-off knives at the cut-off location for dividing the two strips alternately into parts of determinable size, separating such parts in sequence from the strips and delivering them individually to a forming location, a dough forming means at the forming location for receiving the individual dough parts and forming them into toroids or alternatively into dough balls of various sizes; roller means are provided for sensing the buildup of the dough batch between the top and bottom roller and the dough divider means; and an electric drive is provided for varying the advancement of the dough batch by the advancing roller in response to the amount of buildup of dough sensed by said sensor roller.

33 Claims, 18 Drawing Figures

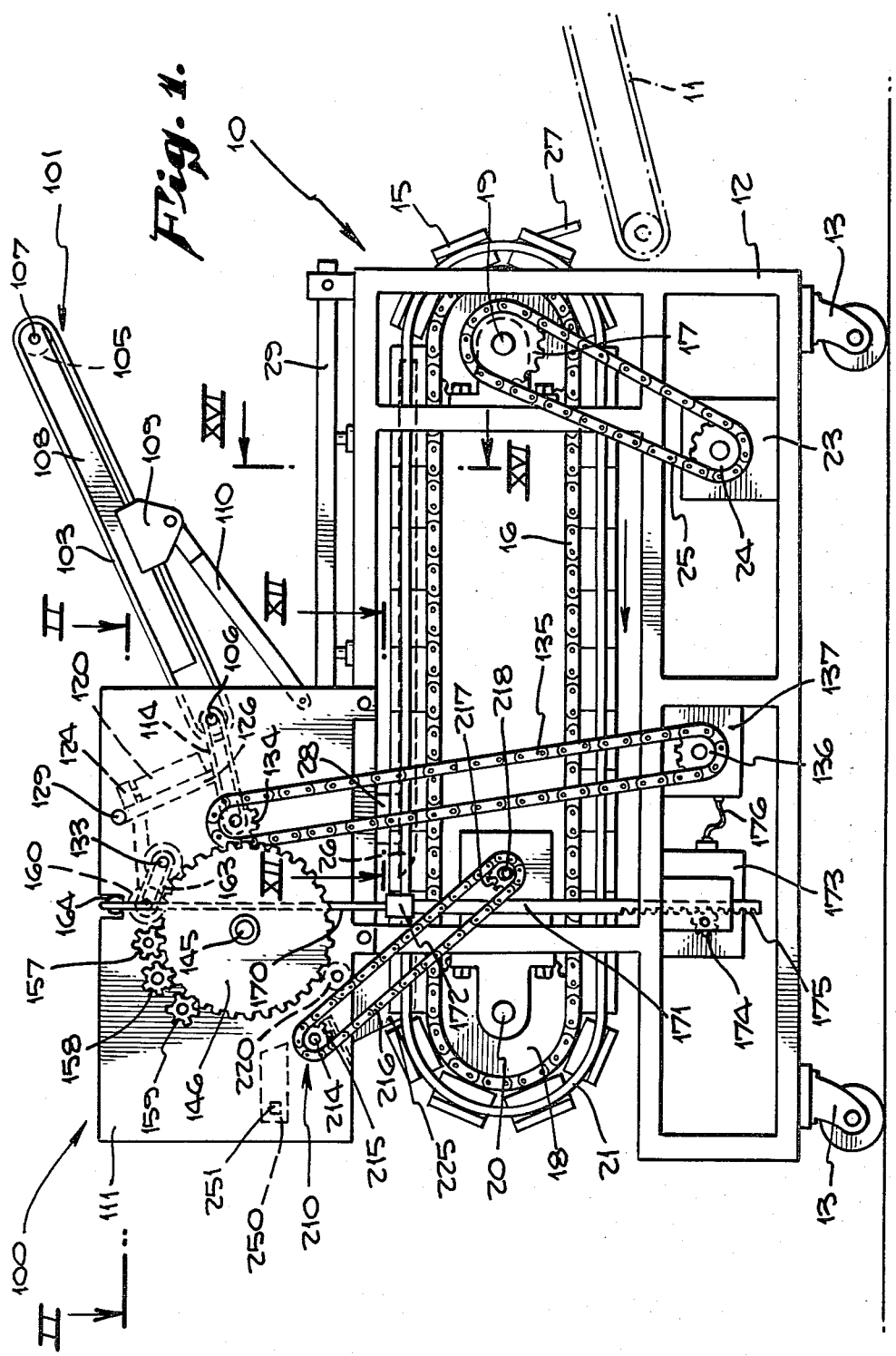

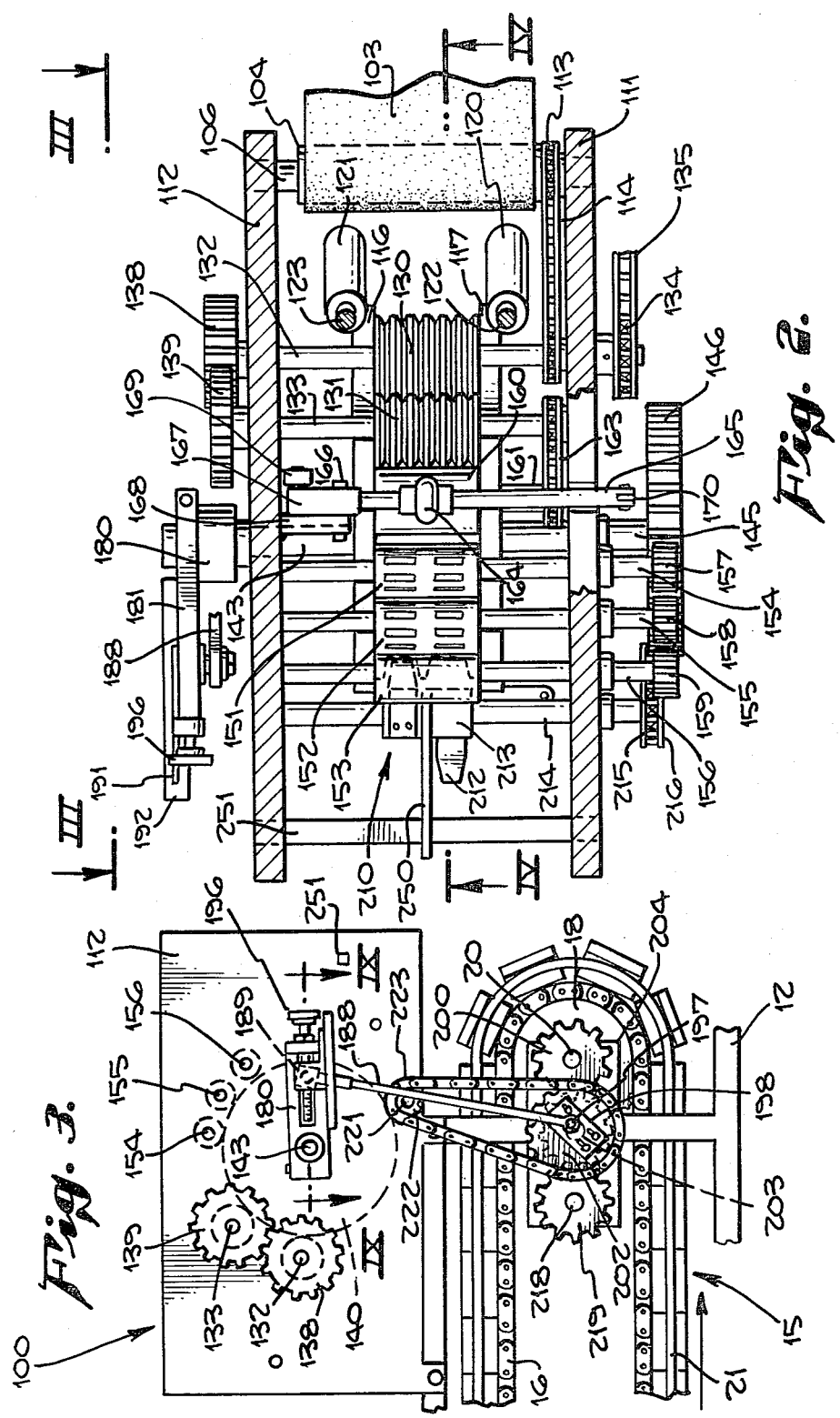

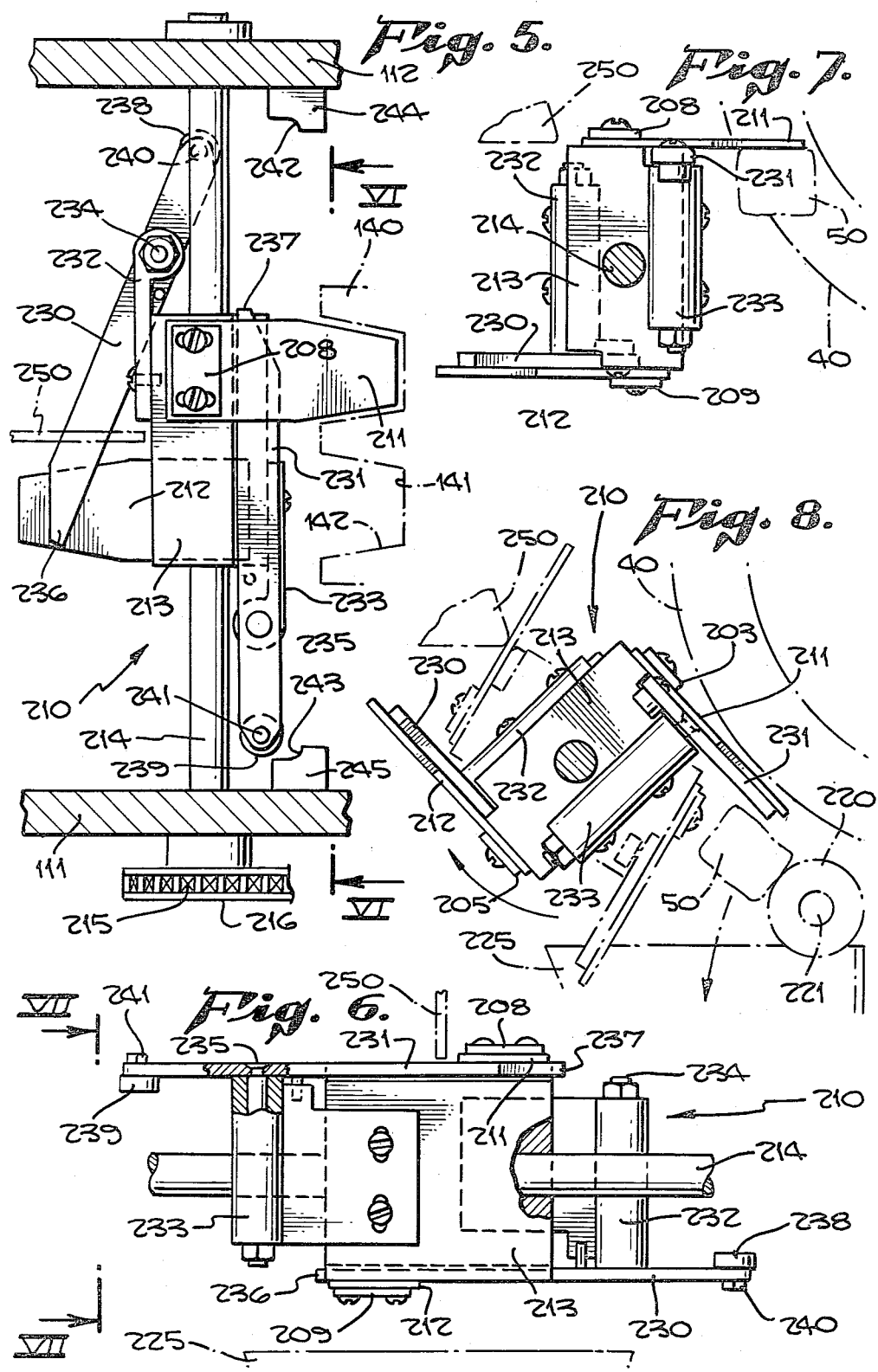

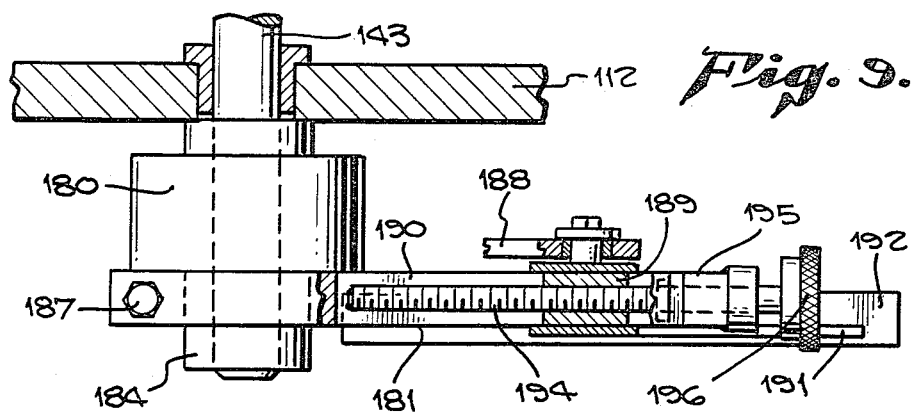
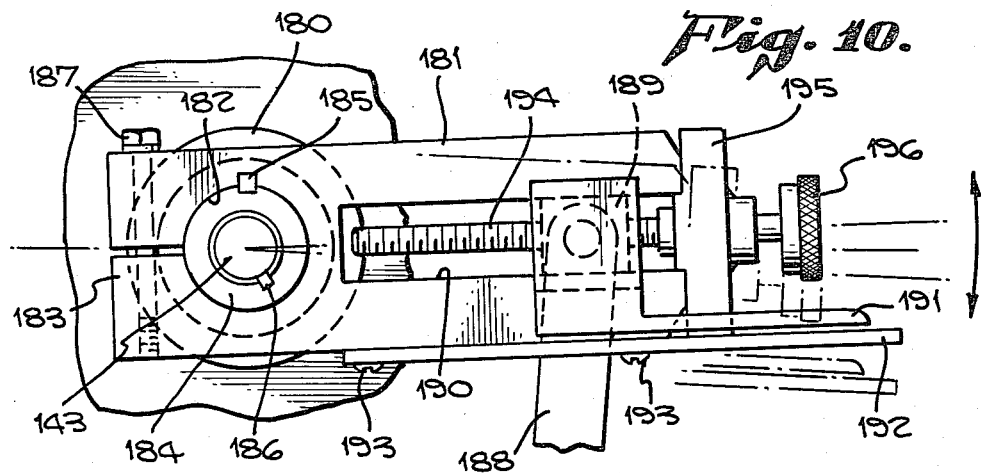
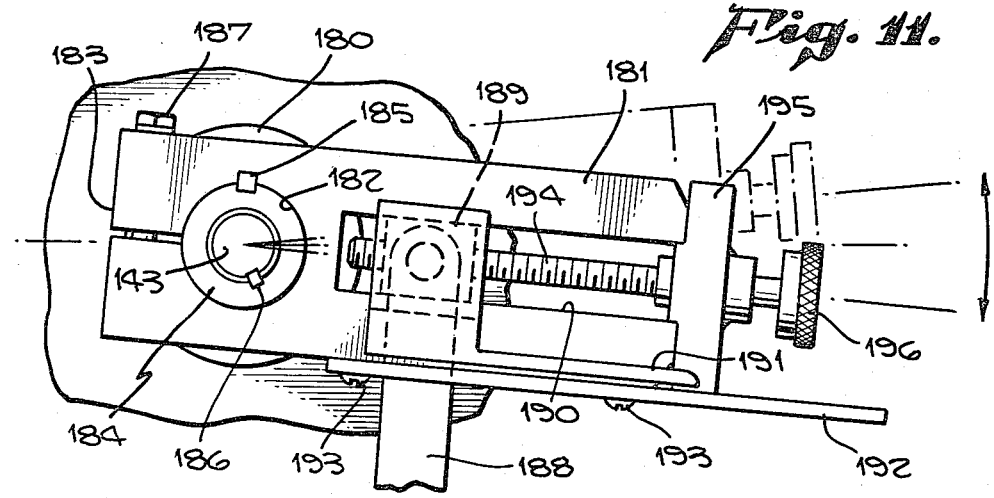

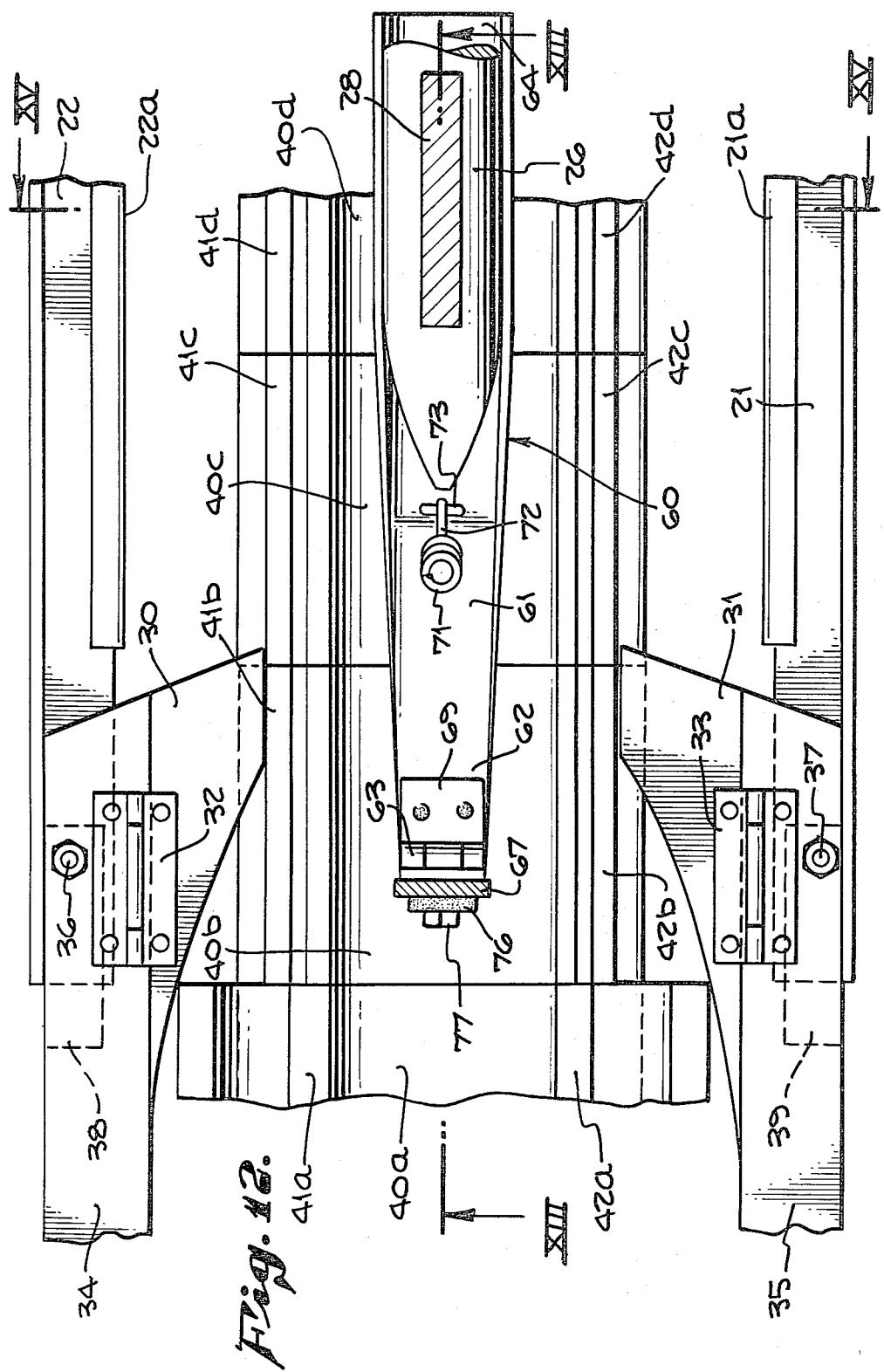

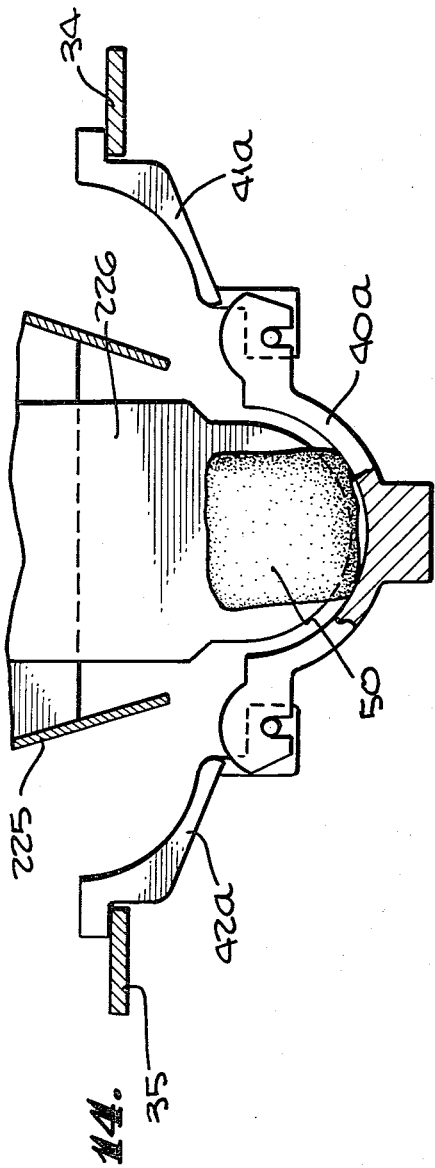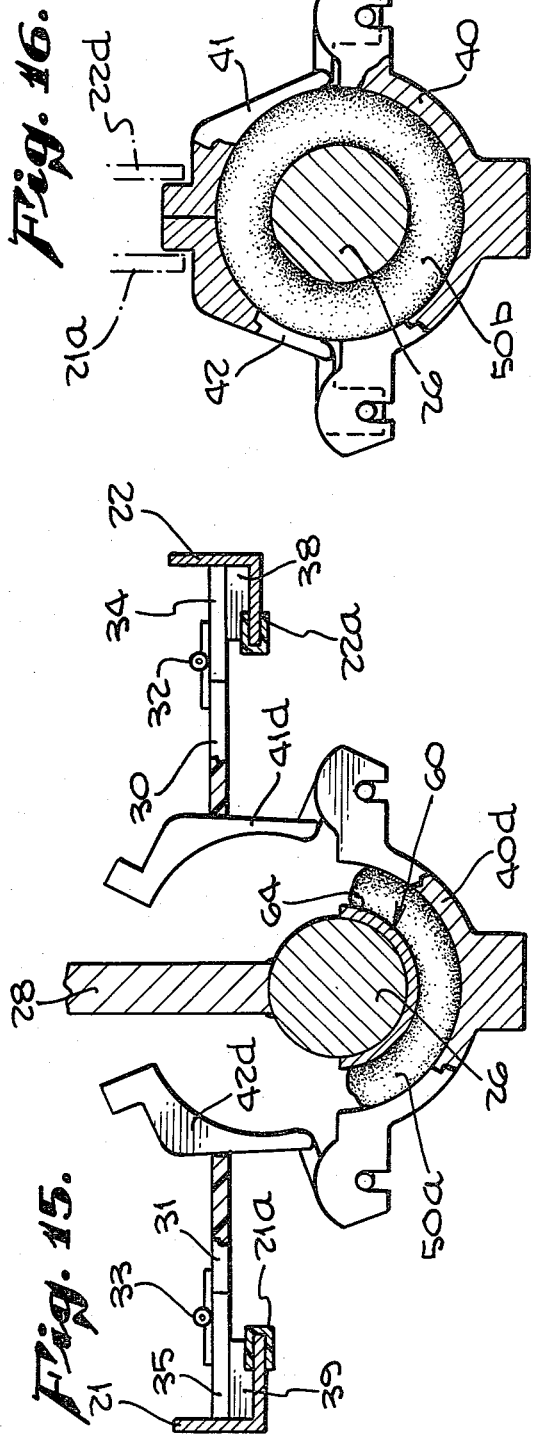

COMPACT DOUGH DIVIDER AND FORMING MACHINE

RELATED APPLICATION

This is a continuation-in-part application based upon my copending prior application Ser. No. 183,187 filed Sept. 2, 1980, now U.S. Pat. No. 4,336,010 and entitled "DOUGH FORMING, DIVIDING AND CUTTING APPARATUS".

BACKGROUND OF THE INVENTION

This invention relates in general to dough shaping apparatus employed to form dough bodies of desired configuration prior to baking items such donuts, bagels or the like. More specifically, the present invention relates to a dough receiving, shaping, dividing and forming machine for making dough bodies of a predetermined weight and configuration of an initially unshaped batch of dough in a continuous manner.

In the toroid forming machine of my prior U.S. Pat. No. 3,792,940, a partially preshaped batch of dough of fairly uniform width was supplied on a conveyor to a dough divider means which divided the batch into two strips of dough which were subsequently cut into rectangular strip parts suitable for forming between a stationary mandrel and moving forming cups into dough toroids suitable for use in making bagels. In the arrangement of that machine, emphasis was placed on providing an easily cleaned toroid forming apparatus with an improved frame assembly for mounting the dough divider subassembly and dough forming subassemblies on a single frame and all of the moving parts of the dough divider and dough forming subassemblies were driven by a single motor in a continuous and uniform manner.

I have determined that it would be more desirable to provide a dough divider and forming machine which is capable of receiving a substantially unshaped batch of dough having width and height dimensions at least greater then some minimum amount and which can then preshape the batch into a rough preshape suitable for receipt in a divider mechanism which will divide the dough with a minimum of working into dough parts suitable for forming not only toroids, as in my prior machine of U.S. Pat. No. 3,792,940, but also dough parts of different configuration for use in other baking procedures. Further, I have determined that it would be very desirable to have such a machine in which the infeed of dough could be controlled so that the divider is constantly supplied with adequate amounts of dough and yet is not over supplied in such a manner as to cause over compression and thus overworking of the dough as it is being formed into dough parts suitable for introduction into a dough forming apparatus as shown in my prior U.S. Pat. No.3,792,940.

SUMMARY OF THE INVENTION

It is therefore the primary object of the present invention to disclose and provide a dough divider and forming machine capable of receiving a substantially unshaped batch of dough of irregular configuration and forming it with a minimum of dough working into dough parts of predetermined weight and configuration suitable to be formed into toroidal, ball or other dough part configurations by an associated dough forming apparatus wherein the dough supply to the divider is controlled in response to the manner in which the dough divider is handling supplied dough to avoid undo buildup of dough at the divider and subsequent overworking of the dough, and wherein all of the machine components are provided on a compact arrangement on a single machine frame. Additional objects are to disclose and provide in the foregoing arrangement an improved dough wiper means in associations with the knife cut-off mechanism employed in the divider, a means for providing an intermittent drive of the dough divider in order to provide for holding the dough in a stationary position while being divided by the cut-off knives into a dough part, a means for varying the extent of advancement of the dough in the intermittent drive of the divider while other components of the apparatus are driven in a continuous manner with the dough infeed into the divider being varied in response to buildup of dough at the divider, an improved mandrel arrangement and camming means associated with the forming cups of my prior U.S. Pat. No. 3,792,940 in order to allow alternate use of the forming means for toroidal dough configurations, dough balls and other dough forms and an improved driving arrangement for operating the forming means and portions of the divider means continuously off of one motor with a variable drive for the infeed of the dough batch in its preshaped configuration to the divider means.

Generally stated, the present invention in a dough batch receiving, shaping, dividing and forming machine includes the provision in association with an infeed conveyor for receiving a batch of unshaped dough and conveying it to a preshaping location, a pair of laterally spaced dough batch width shaping means, preferably of cylindrical roller configuration with axes prependicular to the path of travel of the dough batch to preshape its sides into a uniform width, a pair of vertically spaced top and bottom preshaping and dough advancing means, preferably also of cylindrical roller configuration but with increased surface areas by the provision of a plurality of circumferential grooves on each roller, for preshaping the batch into a generally uniform height and advancing such preshaped batch from between the side shaping means to a divider location and means for varying the speed of advancement of the dough advancing and infeed conveyor in response to the buildup of dough at the dough divider location. More specifically, the present invention includes the provision a dough divider means of drum like configuration having two or more circumferential dough receiving channels of substantially rectangular configuration into which the preshaped dough batch is urged beneath compression rollers, sensor rollers positioned above the drum for sensing the buildup of dough at the divider drum before it passes beneath the compression rollers and associated linkage and electrical means for varying the speed of both the infeed conveyor and the dough advancing means to avoid over supplying dough to the divider drum and its compression rollers such as to cause overworking of the dough as it moves through the divider drum to a cut-off location.

In the dough cut-off location a rotating cut-off knife assembly is provided with an improved dough wiping means for insuring removal of a divided dough part off of the cut-off knife with the dough part being propelled by gravity or a spinning wheel assist mechanism through an improved chute and guide means to the dough forming location. As particularly contemplated within the present invention, the drive for the dough divider drum is intermittent with an intermittent drive clutch and linkage arrangement which allows for varying the length of arcuate advancement of the drum in each incremental advance thereof off of a constant drive for the forming means to selectively adjust and control the weight of dough parts being cut-off by the cut-off means in association with the variable drive of dough supplied to the drum.

As a further part of the present invention, an improved pivoting cam mechanism is employed in association with the forming cups of the toroidal dough forming means to allow a dough forming mode where the cups remain in an opened position as they pass the mandrel location together with the provision of a pivoted premandrel member normally assisting dough preforming as it approaches the mandrel being pivotally mounted to move out of the way along with mandrel removement to provide, in accordance with the present invention, a replacement dough forming means, preferably of an inverted V-shaped trough configuration to form dough balls of various size.

It is believed that those skilled in the art will attain a more complete understanding of the present invention in dough dividing and forming machine, as well as a recognition of additional objects and advantages thereof, from a consideration of the following detailed explanation of a preferred exemplary embodiment thereof. Reference will be made to the appended sheets of drawings which will be first described briefly.

BRIEF DESCRIPTION OF THE DRAWINGS

FIG. 1 is a side elevational view of a preferred exemplary embodiment of dough batch receiving, shaping, dividing and forming machine in accordance with the present invention;

FIG. 2 is a detail view, partially in section, of the machine of FIG. 1 taken therein along the plane II—II;

FIG. 3 is a rear elevational view of portions of the machine of FIG. 1 taken therein along the plane III—III;

FIG. 5 is a horizontal view, partially in section, of the dough cut-off means of the machine of FIG. 4 taken therein along the plane V—V;

FIG. 6 is a front elevational view of the cut-off means of FIG. 5 taken therein along the plane VI—VI;

FIG. 7 is an end view of the cut-off means of FIG. 6 taken therein along the plane VII—VII;

FIG. 8 is a view of the cut-off means of FIG. 7 rotated in a dough part cut-off mode;

FIG. 9 is a detail view of an exemplary embodiment of means for operating the dough divider means in an intermittent dough advancing manner taken along the plane IX—IX in FIG. 3;

FIG. 10 is a front view of the apparatus of FIG. 9;

FIG. 11 is a view as in FIG. 10 showing the apparatus in a mode producing a more rapid dough advancing manner of movement for the dough divider means than that for FIG. 10;

FIG. 12 is a horizontal view, partially in section, of the dough forming means of the machine of FIG. 1 taken therein along the plane XII—XII;

FIG. 14 is a vertical detail view of a portion of the apparatus of FIG. 4 taken therein along the plane XIV—XIV;

FIG. 15 is a cross-sectional view of the apparatus of FIG. 12 taken therein along the plane XV—XV;

FIG. 16 is a cross-sectional view as in FIG. 15 taken along the plane XVI—XVI in FIG. 1;

DESCRIPTION OF A PREFERRED EXEMPLARY EMBODIMENT

Referring initially to FIG. 1, an exemplary embodiment of dough batch receiving, shaping, dividing and forming machine is illustrated for making dough bodies of a predetermined size and configuration from an initially unshaped batch of dough in a continuous manner and on a single, compact machine frame. In the exemplary embodiment, a dough forming means, indicated generally at 10 is employed which is, except for otherwise stated herein, substantially the same as that in my prior U.S. Pat. No. 3,792,940, the disclosure of which is incorporated herewith by this reference. The dough divider means, indicated generally at 100, except as otherwise stated herein, is substantially the same as that in my copending application for U.S. Letters Patent Ser. No. 183,187 filed Sept. 2, 1980, this application being a continuation in part of said application Ser. No. 183,187 the disclosure of which is incorporated herewith by this reference. The dough forming means indicated generally at 10 and the dough divider means, indicated generally at 100, cooperate together in the present compact arrangement, together with additional novel components discussed hereinafter, to produce an improved dough receiving, shaping, dividing and forming machine compared to those disclosed in my prior patent and patent application.

Figure 13:
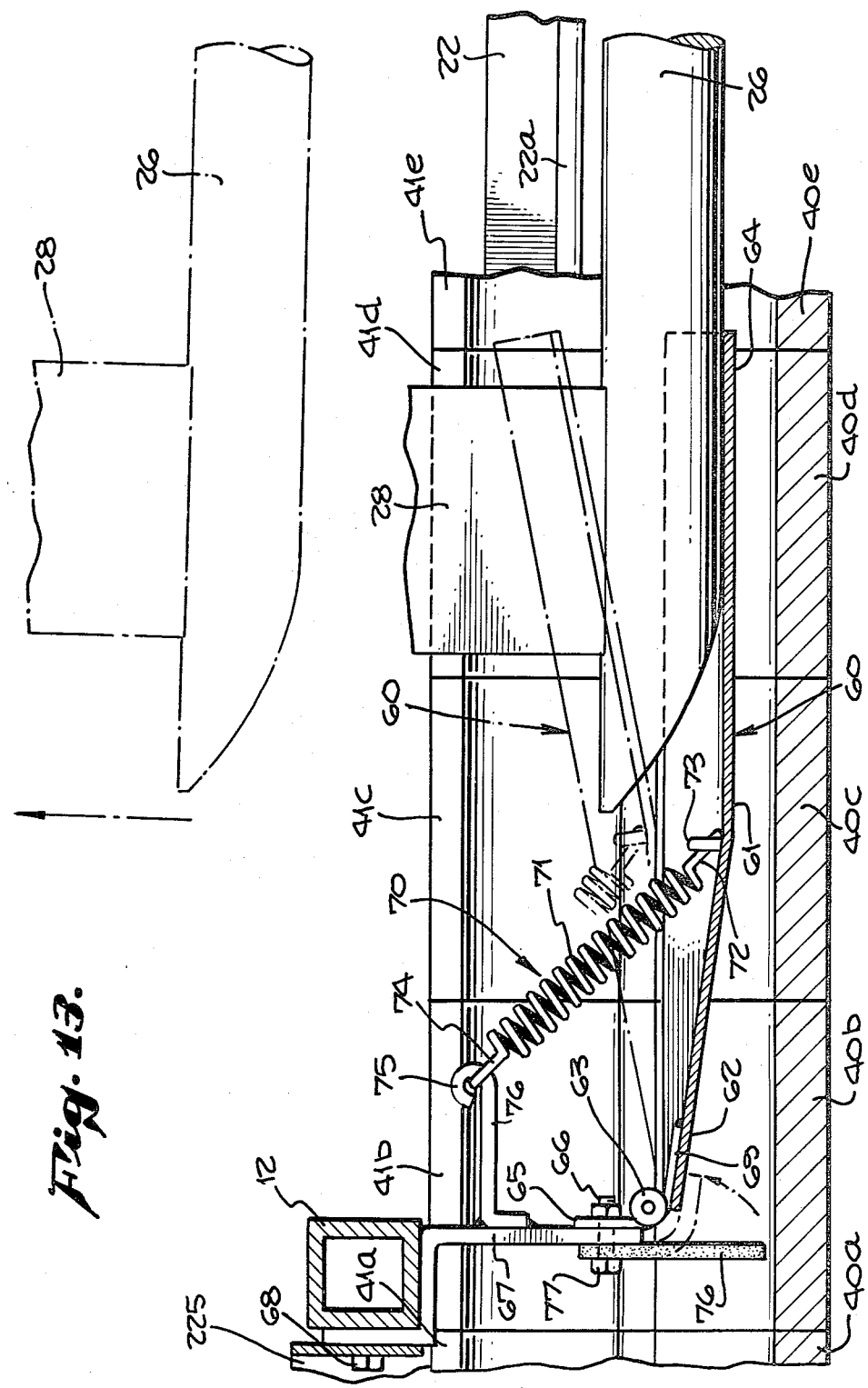
FIG. 13 is a vertical section view of the apparatus of FIG. 12 taken therein along the plane XIII—XIII.
Figure 17:
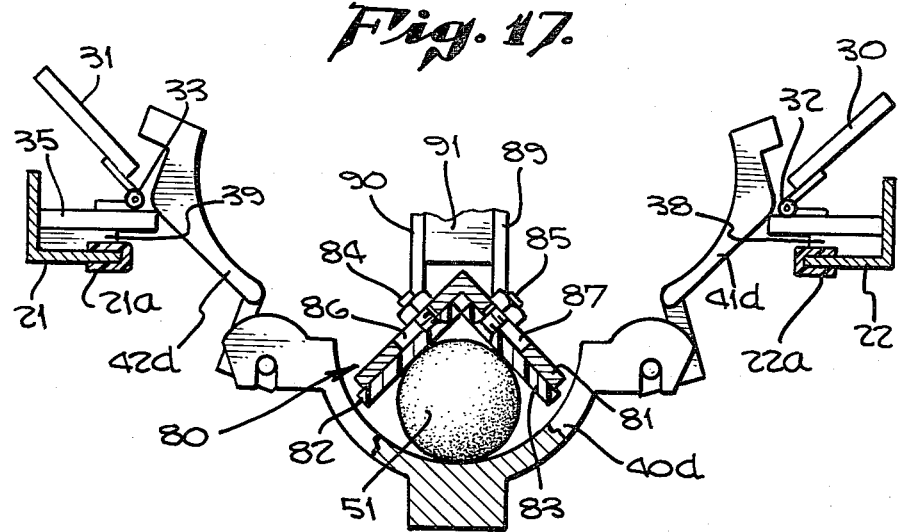
FIG. 17 is a view as in FIG. 14 showing an alternative exemplary embodiment of dough forming means.
Figure 18:
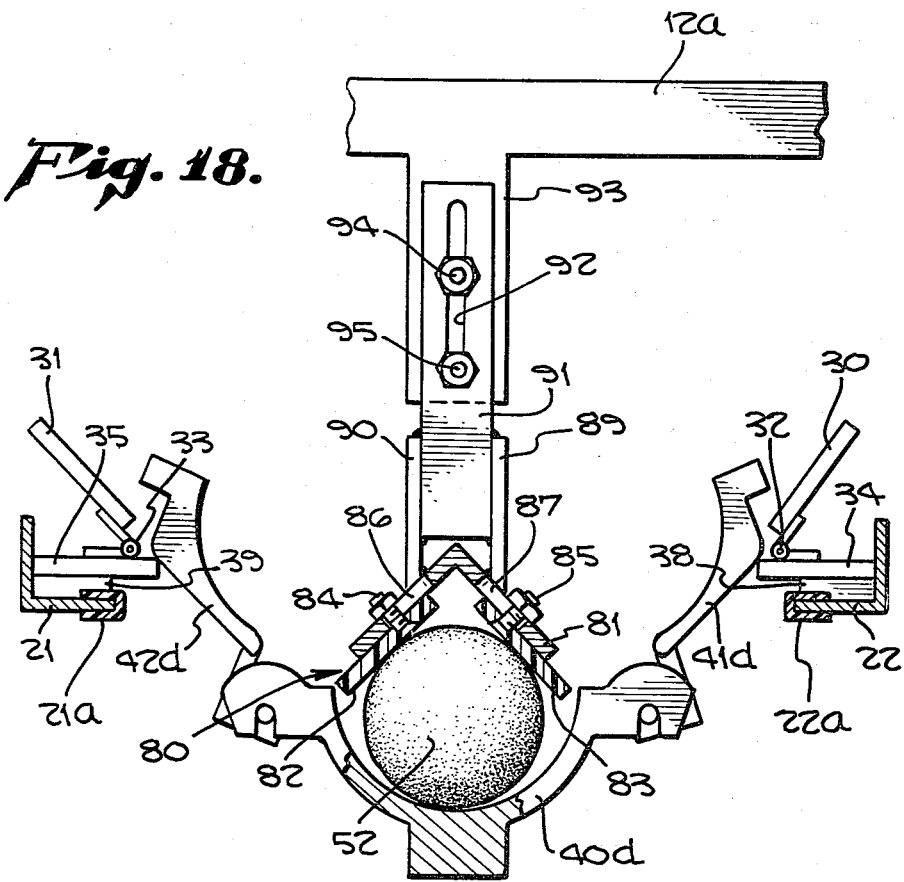
FIG. 18 is a view as in FIG. 17 showing the apparatus adjusted for rolling a larger size dough ball.

The exemplary dough forming apparatus, indicated generally at 10, includes frame 12 seated on four corner casters 13 with a series of articulated toroid forming segmented tubular cups, indicated generally at 15, mounted on cup chain 16 run about drive sprocket 17 and support sprocket 18, the sprockets being mounted on sprocket shafts 19 and 20, respectively, journalled in appropriate journal bearing blocks, as illustrated in FIG. 1, mounted to frame 12. The segmented cups, as best seen in FIGS. 17 and 18, open under the force of gravity as they move along the bottom lay of chain 16 between sprockets 17 and 18 and are closed by side cup guides, 21 and 22 as they approach the upper lay of chain 16 under the drive of motor 23 operating through drive sprocket 24 and drive chain 25 which engages about driven sprocket 17 on shaft 19 of the chain sprocket 17. As seen in FIGS. 1, 12, 15 and 16, a toroid forming mandrel 26 having a depending tail 27 overlying out feed conveyor 11 is mounted by a single vertical support arm 28 depending from horizontal bar 29 pivotly mounted to frame 12 to facilitate pivoting of the mandrel away from the forming cups, as seen in FIG. 13 in dotted line, to allow use of an alternative forming apparatus, as discussed subsequently, and as seen FIGS. 17 and 18. The dough forming means thus far described is substantially the same as that in my prior U.S. Pat. No. 3,792,940.

As particularly contemplated within the present invention, means are provided as best seen in FIGS. 13 through 18 for modifying the dough forming means to form dough ball of various sizes. The cup closing cams 30 and 31, in accordance with present invention, are pivoted by hinges 32 and 33 mounted to support bars 34 and 35 by bolts 36 and 37 together with spacers 38 and 39 as best seen in FIGS. 12 and 15. The series of articulated cups, indicated generally 15, are provided with each cup having a base bar 40 and two pivoted, or segmented, side parts 41 and 42. When the pivoted cams 30 and 31 are in the operative position of FIGS. 12 and 15, with the mandrel 26 positioned in its operative position, the forming apparatus is in its toroid forming mode wherein a lump of dough 50 is received in the open cup, as seen in FIG. 14, from the divider means indicated generally at 100 discussed hereinafter, and is rolled into a preshaped dough configuration 50a beneath a premandrel 60 as seen in FIG. 15 into a toroidal configuration 50b, as seen in FIG. 16. Guides 21a and 22a depend from the mandrel support bar 29 to maintain the cup halves closed during toroid forming as seen in FIG. 16.

As is also contemplated within the present invention, a premandrel member 60, as best seen in FIGS. 12 and 13, is provided in the preferred exemplary embodiment for facilitating a preshaping of the dough part 50 into a preshaped elongated configuration as dough element 50a in FIG. 15. The exemplary premandrel 60 comprises rearward semitubular body portion 61 underlying the leading portions of mandrel 26 and a forward generally planar and downwardly inclined leading under surface 62 merging into the body portion 61 tubular surface. Member 60 is hinged at its leading end by hinge 63 with its extreme rear trailing end 64 being held down beneath mandrel 26. Hinge 63, as seen in FIG. 13, comprises a hinge plate 65 mounted by bolts 66 to a support plate 67 fastened by suitable bolts 68 to a cross brace of frame 12. Lower hinge plate 69 may be welded or riveted to the leading edge of premandrel member 60 with a spring biasing means, indicated generally at 70, for biasing member 60 into a raised inoperative position indicated in dotted line in FIG. 13 when mandrel 26 is removed to an inoperative position as indicated in dotted line in FIG. 13. The exemplary spring biasing means includes coil spring 71 connected at its lower end 72 to eye 73 formed in premandrel member 60 with its opposite, upper end 74 connected to eye 75 of support arm 76 welded or otherwise fastened to support plate 67. A vertical flexible neoprene strip 76 is mounted by bolt 77 to support plate 67 forwardly of premandrel 60, at its hinged end, which acts as a stop for dough parts kicked toward it by tab 226 to facilitate a timed spacing of dough parts rolled by the forming cups under the mandrel.

A dough ball forming mode for the forming means, indicated generally at 10, is provided when the mandrel 26 and premandrel 60 are in their raised positions as indicated in dotted line in FIG. 13 a mandrel replacing dough forming means is indicated generally at 80 in FIGS. 17 and 18 above the top chain lay of the forming cups indicated generally at 15. The cups remain opened when pivoted closing cams 30 and 31 are in the inoperative positions as seen in FIGS. 17 and 18. The exemplary mandrel replacing dough forming means indicated generally at 80, includes a inverted V-shaped trough or base 81 which may be provided with a longitudinal extent comparable to that of mandrel 26 which it replaces. Plastic dough contacting plates 82 and 83 are adjustable mounted to the legs of the V-shaped base 81 by bolts 84 and 85 adjustably positioned in slots 86 and 87 in the base 81. Dough contacting plates 82 and 83 are preferably of a plastic rectangular configuration having an extent substantially the same as base 81 and can be adjusted as seen from a comparison of FIGS. 17 and 18 for accommodating various size dough balls being rolled therebelow by the under running dough forming open cups. Trough or base 81 is secured, as by welding, to a pair of longitudinally extending support plates 89 and 90 which are in turn mounted, as by welding, to support bar 91 mounted in adjustable fashion to cross brace 12a and its depending leg 93 via the slot 92 in bar 91 and the mounting bolts 94 and 95. It should be understood by those skilled in the art that a plurality of such cross braces 12a and support bars 91 may be provided along the extent of base 81 and its support plates 89 and 90 as required to support the inverted V-shaped trough or base 81 on the top longitudinal frame members or frame 12. Such cross braces 12a may be bolted in easily removable manner to frame 12 to facilitate the assembly and disassembly of the mandrel replacing dough forming means indicated generally at 80, when the dough ball forming mode of the apparatus is to be employed.

Figure 4:
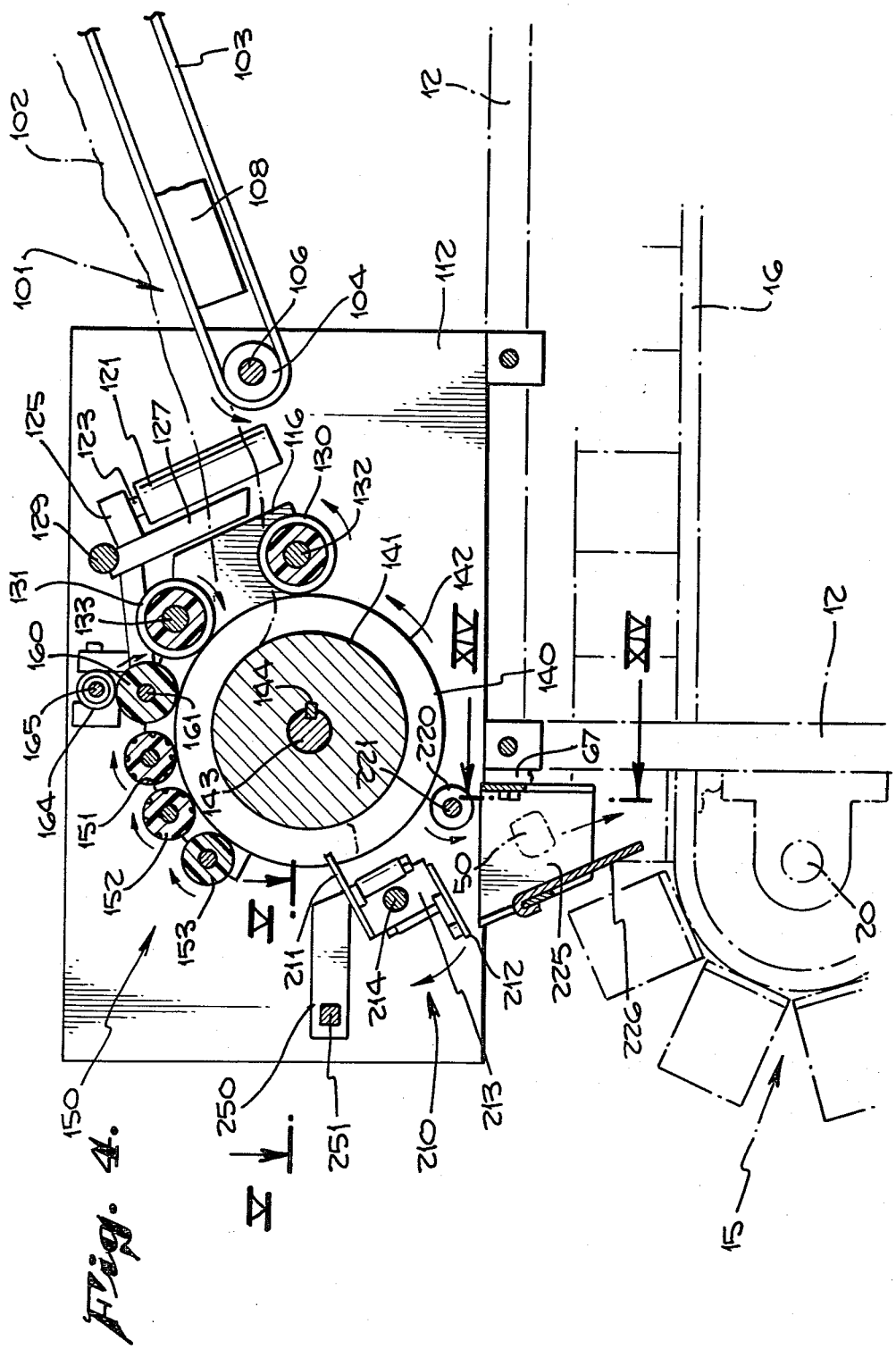
FIG. 4 is a vertical section view of the machine of FIG. 2 taken therein along the plane IV—IV.

The exemplary embodiment of dough divider means, indicated generally at 100, is best seen in FIGS. 1 through 4. As particularly contemplated within the present invention, a batch of unshaped dough 102 is provided on infeed conveyor 101 having conveyor belt 103 revolving in known manner about spaced end pulleys, as pulley 104 (in FIG. 4) and 105 (FIG. 1) on support shafts 106 and 107 associated with side support frames, as side frame 108, supported on bracket 109 mounted by arm 110 to front plate 111 of the divider means support plates including the front plate 111 (FIG. 1) and the back plate 112 (FIG. 4). The infeed conveyor is driven by belt 114 engaging pulley shaft 106 off of the variable speed drive of motor 137 as subsequently described. Spaced inwardly of divider support plates 111 and 112 are dough path forming side plates 116 and 117, as best seen in FIG. 2, between which the dough passes through the divider means as will now be described.

As the dough batch 102 is advanced on conveyor 101 in an unshaped condition, it initially passes between a pair of laterally spaced dough batch with shaping means at a preshaping location at the entrance of the divider means adjacent the delivery end of the infeed conveyor indicated generally at 101. In the exemplary embodiment, such width shaping means includes the provision dough batch side rollers 120 and 121 as seen in FIGS. 2 and 4, of cylindrical configuration which are freely rotating about roller shafts 122 and 123 which are normal to the path of batch movement from conveyor 101. In the exemplary embodiment, the cylindrical roller shafts 122 and 123 are perpendicular to the plane of the upper lay of conveyor 103 so as to be positioned to engage and preshape the sides of dough batch 102 to a preshaped uniform width. Each of the roller shafts 122 and 123 is mounted from a support block in free pivotable manner, as block 125 in FIG. 4, with the blocks being mounted in fixed relation to support bars depending from a suitable cross brace between plates 111 and 112 as support bar 127 in FIG. 4 is shown secured to cross brace 129.

A pair of top and bottom preshaping and dough advancing means are provided in accordance with the present invention for drawing the dough batch 102 between rollers 120 and 121, shaping the batch into a generally uniform height and grasping and advancing the dough batch from between rollers 120 and 121 onwardly to the divider drum 140. In the exemplary embodiment, such top and bottom preshaping and dough advancing means includes the provision of grooved infeed rollers 130 and 131 as best seen FIGS. 2 and 4. Top infeed roller 130 and bottom infeed roller 131 are grooved by circumferential grooves in order to increase the surface area of the rollers to engage the dough batch to draw it along between side plates 116 and 117 without undo working of the dough. Rollers 130 and 131 are mounted on horizontal spaced shafts 132 and 133 which extend past dough path side plates 116 and 117 to be journalled in divider support plates 111 and 112 as seen in FIG. 2. A sprocket 134 is provided forwardly of front plate 111 in fixed manner on the end of shaft 132 to drive roller 130 in predetermined manner by operation of chain 135 run about drive sprocket 136 of a variable speed motor 137. Motor 137 can be drive at variable speeds, as discussed hereinafter in association with potentiometer 173, in order to selective vary the speed of infeed roller 130, and consequently the other infeed roller 131 in view of the gear drive provided between the two shafts 132 and 133 by meshing end gears 138 and 139 provided rearwardly of back plate 112. It should be understood by those skilled in the art that rollers 130 and 131 revolve in opposite directions, as indicated by the arrows in FIG. 4, to cause their facing surfaces to move in the same inward direction toward drum 140 to advance the dough batch therebetween. As will be discussed hereinafter, it is particularly contemplated within the present invention to be able to adjust the speed of these rollers 130 and 131, as well as the speed of conveyor 101 in response to the buildup of the dough batch as it is applied to drum 140 as will now be discussed.

The divider means of the present invention includes the provision of a divider drum 140 whose configuration is best seen from a comparison of the elevational view of FIG. 4 and the partial cross section view, in dotted line, of FIG. 5. The divider drum is provided with a inner drum surface 141 in each of two or more side by side provided circumferential channels formed between side walls as side wall 142 in FIG. 4 and the adjacent walls as seen in FIG. 5. In the exemplary embodiment, two outer and two central side walls form two channels, as seen in dotted line in FIG. 5, which extend around drum 140 and into which the dough batch 102 is urged by the dough advancing rollers 130 and 131. The dough batch in the exemplary embodiment, is thus divided into two parts which fill the two channels of the drum as it revolves on its drum shaft 143 to which it is keyed by key 144. Dough urged into the drum channels is confined therein by the compression rollers indicated generally at 150 and including rollers 151, 152 and 153 mounted on shafts 154, 155 and 156 journalled in support plates 111 and 112. These compression rollers are revolved along with the divider drum 140 through the provision of compression roller gears 157, 158 and 159, secured to shafts 154, 155 and 156, as seen in FIG. 2, and with the gears meshing with a drive gear 146 mounted to a forward extension 145 of the drum shaft 143. Divider drum 140, and its associated compression rollers 151, 152, and 153 are drive, in the exemplary embodiment, in an intermittent dough advancing manner by an intermittent drive assembly illustrated in FIGS. 9 through 11 which engage drum shaft 143 rearwardly of rear plate 112 as best seen in FIG. 3 and as will be subsequently described.

As is also particularly contemplated within the present invention, the rate of dough advancement onto divider drum 140 from between dough advancing rollers 130 and 131 is controlled in response to the buildup of the preshaped dough batch in the area between side plates 116 and 117 wherein the dough has left rollers 130 and 131 and is entering and engaging the divider drum prior to entering below compression rollers 151, 152 and 153. Sensor means are provided for sensing this buildup of the dough batch and, in the exemplary embodiment, includes the provision of a floating roller 160 which is rotatably mounted on its support shaft 161, shaft 161 being mounted from a pair of side arms, as are 162 which are in turn pivotally mounted from a support member, as support member 127 depending from cross brace 129. Sensor roller 160 is thereby freely rotatable about its shaft with its shaft mounted for vertical swinging movement on the end of side arms, as arm 162, to rise and fall under a buildup of the preshaped dough batch as it is rolled into drum 140 past the top dough advancing roller 131. As contemplated within the present invention, means are also provided for veering the speed of advancement of the dough batch onto drum 140 in response to movement of the sensor means floating roller 160 as will be now explained.

As best seen in FIG. 4, sensor means floating roller 160 is provided with a sensor follower 164 which may comprise a circular roller type member mounted about a horizontal shaft 165 which is pivotally mounted by pivot rod 166 extending through a shaft end block 167 and a support bracket 168 as best seen in FIG. 2. A counter balance weight 119 outwardly of pivot 166 counter balances the weight of arm 165 and its follower 164 lying on top of floating roller 160. At the free end of shaft 165, as best seen in FIG. 1, a vertical or depending rod including an upper rod part 170 and lower rod part 171 in length adjustment relation by adjust nut 172 interacts with a potentiometer 173 having a control gear 174 engaging rack teeth 175 on the lower end of rod portion 171. Selective positioning of rotatable gear 174 operates potentiometer 173 to control through electrical connection 173 the speed of operation of variable drive motor 137. From the foregoing, it can be seen by those skilled in the art, that as the preshaped dough batch 102 buildup on entering drum roller 140 beneath floating roller 160, the rise and fall of roller 160 is translated through arm 165 and rod 170, 171 to control of potentiometer 173 and thus the speed of operation of variable drive motor 137, the latter running the infeed conveyor via chain 135 and sprocket 134 operating the shaft 132 on which conveyor drive chain or pulley 114 operates between shafts 132 and conveyor shaft 106, as well as operating the dough advancing rollers 130 and 131. Overworking of the dough batch can thus be avoided as it is drawn on drum 140 beneath the compression rollers 151, 152 and 153 since a controlled amount of dough is being supplied to the drum, which initially divides the preshaped dough batch in the exemplary embodiment into two elongated strips of dough which are rotated on the drum toward the cut-off means indicated generally at 210 and which will be subsequently described. At present, however it should be noted that the two dough strips being formed on the drum of the present exemplary embodiment have a generally rectangular cross section suitable for being formed into cubes by the cut-off means as discussed subsequently. The intermittent drive means for the divider drum 140 will now be described.

Means are provided in the exemplary embodiment for operating the dough divider drum 140 in an intermittent dough advancing manner to advance the dough strips formed in an advancing, and then stationary, intermittent manner to facilitate the cut-off of the cubic dough parts without excessive working of the dough. As best seen in FIGS. 2 and 9 through 11, the exemplary intermittent drive means includes the provision of a one way ratchet type rotary clutch 180 operating drum shaft 143, the clutch 180 being mounted on the rear dough divider support plate 112 as seen in FIGS. 2 and 9. Operation of the clutch is accomplished by an appropriate lever arm 180 which has an aperture 182 at its split end 183 receiving a spacer ring 184 keyed by key 185 to arm 181 and by key 186 to drum shaft 143, bolt 187 being provided to tighten the arm split end to retain it in assembled relation. A drive arm 188 extends vertically between its pivotal mounting on slide block 189 which rides in slot 190 in arm 181. Smooth sliding movement of block 189 in slot 190 is assured by the provision of block foot 191 which engages slide plate 192, the latter being mounted by screws, as screw 193, to arm 181. The position of slide block, and thus the stroke of arm 181 under the action of drive arm 188, is controlled by rotation of adjustment screw 194 mounted in end plate 195 and having manually operable knob 196. As seen in FIG. 10, with slide block 189 moved toward right hand end of slot 190, the stroke of arm 189 up and down in the direction of the arrow at the right hand end of the Figure is of a lesser amount then is the stroke of arm 181 in FIG. 11 where the block has been moved by the adjustment screw toward the left hand end of slot 190. The incremental advance of shaft 143, and thus divider drum 140 is thus greater in FIG. 11 then it is in FIG. 10 for a given stroke of arm 188 imparted by mounting the lower end 197 of rod 188 eccentrically on plate 198 which is secured to sprocket 202 which is mounted on a jack shaft 203, indicated in dotted line in FIG. 3, as engaging an idler gear, seen in dotted line in FIG. 3 behind sprocket 202, which is engaged between drive sprocket 200 on shaft 20 and the driven sprocket 219 as seen in FIG. 3. Since shaft 20 is operated by chain sprocket 18 with the chain being driven by its forward sprocket on shaft 19 driven by motor 23, it can be seen that the drum 140 is driven under the power of the dough forming drive motor 23 with that drive being translated into an intermittent drive of a variable extent by the intermittent drive means just described including clutch 180 and the associated adjustable drive arms 181 and 188 as seen in FIGS. 9 through 11.

The cut-off mechanism of the present exemplary embodiment is best seen in FIGS. 1, 3 and 4. Referring initially to FIG. 4, the exemplary cut-off means includes a rotating lay assembly indicated generally at 210 which includes a pair of oppositely facing cut-off blades 211 and 212 mounted on support block 213 mounted on rotatable shaft 214, shaft 214 having an end 215, as seen in FIG. 2, engaging a sprocket about which drive chain 216 is provided. Chain 216, as best seen in FIG. 1, extends about a second sprocket 217 on shaft 218 which, as best seen in FIG. 3, extends rearwardly of a support plate 204 to engage in sprocket or gear 219 which is driven, as aforestated, off of sprocket 200 by an intermediate idler gear or sprocket. The cut-off laid assembly 210 is thus driven by motor 23 with the individual blades 211 and 212 being shaped to enter the drum channels as seen in FIGS. 4 and 5 to cut-off a generally cubic shaped dough part 50. As is known in the art, a spin off wheel 220 may be provided to throw the lump in a desired direction, wheel 220 being mounted on shaft 221, as best seen in FIG. 3, is driven by its shaft sprocket 222 engaging chain 223 running about sprocket 202. Spin off wheel 220 is thus also run off of the drive of motor 23. While the foregoing cut-off means thus far described is now conventional in the art, it is contemplated within the present invention to provide an improved blade wiper means for wiping a dough part divided from the dough strip in the divider drum channels by one of the cut-off blades 211 and 212. In the exemplary embodiment, such blade wiper means includes the provision of wiper blades 230 and 231, as best seen in FIG. 5, which are pivotally mounted to brackets 232 and 233 by pivot pins 234 and 235 which may be held to the brackets by appropriate end fasteners such as the nuts illustrated in FIG. 5. The wiper blades have a chamfered free end 236 and 237, respectively, with opposite ends having a cam follower roller as rollers 238 and 239. It should be noted that the pivotal mounting for each of the wiper blades is adjacent, but inwardly of the cam follower rollers 238 and 239, the followers being pivoted by pivot pins 240 and 241 respectively as best seen in FIGS. 5 and 6. As is also shown in FIGS. 5 and 6, the cut-off blades 211 and 212 may be held by hold down plates 208 and 209 bolted or screwed to the support block 213 with the wiper blade support brackets 232 and 233 likewise being screwed or bolted to support block 213 with the entire assembly being thereby revolved by shaft 214 to periodically bring the wiper blade cam followers into engagement with cam surfaces 242 and 243 on cam blocks 244 and 245, respective, as seen in FIG. 5. Such engagement pivots the wiper blade about its pivot pin to bring its free end, as end 237 is shown moved from the position of FIGS. 5 and 7 to wiping position in FIG. 8 due to the engagement of follower 239 with cam surface 243. A return or restore cam 250 is mounted on cross brace 251, as best seen in FIGS. 1, 2 and 5 through 8 to engage a mid portion of each wiper blade which has been moved to a wiper position as block 213 revolves bring such positioned wiper blade into engagement with a free pointed end of cam 250 as seen in dotted line in FIG. 8. Each of the wiper blades is thus successively pivoted by its associated cam block surface, as surfaces 242 and 243, into a wiper position and then restored through engagement with cam 250 to a none wiping position ready to be again pivoted by the aforedescribed camming action to dislodge dough parts which might adhere to the associated cut-off blade.

When a dough part has been dislodged from the associated cut-off blade, it then falls by gravity, or under the urging of spin off wheel 220 toward chute 225 as seen in FIG. 4. Chute 225 is provided with substantially vertical side and rear walls as seen in FIG. 4, with the left hand, or forward wall being inclined, notched and provided with a depending removable dough engaging tab 226 which is best seen in FIGS. 4 and 14.

From the foregoing detailed description of an exemplary dough batch receiving, shaping, dividing and forming machine, it can be seen that the present invention accomplishes its aforestated objects and attains the various advantages desired. A lump of unshapened dough in batch form may be provided upon conveyor 101 and fed into the machine components which are all assembled on a single machine frame 12. The dough batch is preshaped between the initial side rollers, again preshaped vertically by the top and bottom dough advancing rollers and urged inwardly thereby toward the rectangularly grooved divider drum 140. The buildup of dough as it enters the drum channels prior to passing beneath the compression rollers is sensed in the present apparatus to slow down the infeed of dough batch by the conveyor and dough batch by the conveyor and dough advancing rollers 130 and 131 through the aforedescribed sensor means and variable drive provided therefore. The generally rectangularly cross sectioned dough strips formed on the divider drum are advanced without undo working in incremental steps to facilitate their being cut-off or divided into rectangular or cubic like dough parts of selectable length depending upon the speed of advancement provided for the intermittent motion of the divider drum relative to the otherwise continuous operation of the dough forming and dough cut-off means under the variable drive supply of dough to the drum. This arrangement produces a dough part which is not overworked and is ready for dough forming immediately which, in the present machine is accomplished by directing such divided dough parts directly and immediately into a dough forming apparatus capable of forming toroidal or dough ball configurations as desired. The machine is compact in size and utilizes a single drive motor 23 for operating the dough forming and divider means operations with the dough batch infeed variable drive being accomplished by the variable speed motor 137. A somewhat simplified and less expensive machine is thereby provided in that motor 23 accomplishes a plurality of driving functions in the present machine with an intermittent drive for the divider drum being accomplished while the other components associated with motor 23 are driven continuously.

Having thus described an exemplary embodiment of dough batch receiving, shaping, dividing and forming machine in accordance with the present invention, it should be understood by those skilled in the art that various modifications, adaptations and alternative embodiments may be made thereof within the scope of the present invention which is defined by the following claims.

I claim:

1. A dough batch receiving, shaping, dividing and forming machine for making dough bodies of predetermined size and configuration from an initially unshaped batch of dough in a continuous manner, said machine comprising:

An infeed conveyor for receiving a batch of unshaped dough and conveying it to a preshaping location;

a pair of top and bottom preshaping and dough advancing means for preshaping said batch into a uniform height and advancing said batch from between said width shaping means to a divider location;

dough divider means at said divider location for receiving said dough batch in a preshaped configuration, shaping it to a generally retangular cross section strip of dough and advancing the strip to a cut-off location;

dough cut-off means at said cut-off location for dividing said strip into generally rectangular cross-section parts of determinable length, separating such parts in sequence from said strip and delivering them individually to a forming location; and dough forming means at said forming location for receiving individual dough parts of generally rectangular cross section and forming them into a desired configuration such as toroidal, drive means for operating said dough divider means in an intermittent dough advancing manner to advance said strip, in a intermittent motion manner to said cut-off location, said drive means being a variable drive means for operating said infeed conveyor and said top and bottom preshaping and dough advancing means at selectably varying speeds of dough batch advancement, said variable drive means including dough batch engaging and height sensor means for sensing the height of the said dough batch after it leaves said top and bottom preshaping and dough advancing means in preshaped configuration and as it enters said divider means; and means for operating said variable drive means to speed up or slow down the advancement of said dough batch infeed by said conveyor means and dough advancing means in response to the height of said preshaped configuration of dough batch sensed by said sensor means.

2. The machine of claim 1 wherein width dough batch side preshaping means comprise a pair of laterally spaced cylindrical rollers freely rotating about roller shafts which are normal to the path of batch movement from said conveyor.

3. The machine of claim 1 wherein each of said infeed conveyor, width preshaping means, top and bottom preshaping and dough advancing means, divider means, cut-off means and forming means are mounted on a single machine frame.

4. The machine of claim 1 wherein said dough forming means includes a series of toroid forming segmented cups traveling on a cup chain run about horizontal axis and laterally spaced support drive sprockets relative a stationary mandrel with the cups in an open dough part receiving position prior to passing the mandrel, said machine further comprising:

a vertical chute positioned below said dough cut-off means and above said cups when in said open dough part receiving position whereby dough parts divided by said cut-off means from said dough strip fall virtually straight downwardly through said chute to said forming means open cups.

5. The machine of claim 4 wherein said vertical chute is provided with a removable dough engaging tab depending from said chute into a sapce in said dough forming means about which said open cups pass whereby a falling dough part may be selectively constrained into a desired landing position in said forming means and said tab may be easily removed for cleaning.

6. The machine of claim 1 wherein:

a first motor is provided for operating said variable drive means for said infeed conveyor and said top and bottom preshaping and dough advancing means; and a second motor and associated drive means are provided for operating all of said dough divider means, cut-off means and forming means by said second motor.

7. The machine of claim 6 wherein:

said associated drive means includes means for operating said dough divider means in an intermittent dough advancing mode whereby said strip of dough at said cut-off location is intermittently stationary for a dough part cut-off from said strip.

8. The machine of claim 7 wherein:

said associated drive means includes means for continuously operating said cut-off means and forming means; and said variable drive means for said infeed conveyor and dough advancing means includes means for continuously operating them, whereby said dough batch is continuously fed from said conveyor past said width preshaping means and between said top and bottom preshaping and dough advancing means, intermittently advanced by said divider means, continosly cut-off into dough parts by continuous operation of said cut-off means and said dough parts are continosly formed from said generally rectangular cross-section into said desired configuration by said forming means.

9. The machine of claim 1 wherein said dough forming means includes a series of torid forming cups run on a conveyor chain driven about horizontally spaced sprockets with a mandrel positioned to have said cups pass thereabout and further comprising:

a premandrel member having a generally planar and downwardly inclined leading undersurface merging into a rearward semi-tubular trailing body portion;

means for mounting said premandrel member relative said cups and said mandrel whereby received dough parts are carried by said cups under said premandrel for preshaping of said parts as they approach said mandrel.

10. The machine of claim 9 wherein:

a vertical strip of resilient material is provided forwardly of said premandrel in the path of travel of said dough parts to facilitate a timed and spaced passage of said dough parts beneath said premandrel.

11. The machine of claim 9 wherein said mounting means includes:

means for pivotally mounting said premandrel member for pivotal movement away from said cups to an inoperative position.

12. The machine of claim 11 wherein:

biasing means are provided for biasing said premandrel member about its pivotal mounting toward said inoperative position, said mounting means locating said premandrel member trailing body portion below leading portions of said mandrel to be normally held thereby against said biasing.

13. The machine of claim 1 wherein said dough forming means includes a series of articulated toroid forming segmented tubular cups on a drive chain run horizontally about spaced chain support and drive sprockets, camming means for moving the cup segments between a open dough position moving on the bottom chain lay below and between said sprockets and a closed toroid forming tubular position when moving on said top chain lay above and between said sprockets and a removable mandrel above the top chain lay about which the closed cups move to roll dough parts into toroidal shapes between said cups and mandrel and comprising:

means for selectively pivoting portions of said camming means away from an operative position to an inoperative position relative said cups whereby said cups remain in said open position when moving on said top chain lay when said camming means portions are in said inoperative position.

14. The machine of claim 13 wherein:

mandrel replacing dough forming means are provided for being located above said top chain lay in place of said removable mandrel when the latter is removed therefrom.

15. The machine of claim 14 wherein said mandrel replacing dough forming means comprises:

an inverted V-shaped longitudinally extending trough; and means for mounting it in vertically adjustable manner over said top chain lay on which said open cups are located to form dough parts therewith into dough ball configurations.

16. The machine of claim 15 wherein said mandrel replacing dough forming means further comprises:

a pair of longitudinally extending generally rectangular dough contacting plates, and means for adjustably mounting each of said plates to an underside of one leg of said V-shaped trough whereby said trough and plates may be adjusted relative said cups to roll various size dough balls.

17. A dough receiving, shaping, dividing and forming machine for making dough bodies of predetermined size and configuration from an initially unshaped batch of dough in a continuous manner, said machine comprising:

an infeed conveyor for receiving a batch of unshaped dough and conveying it to a preshaping location;

a pair of laterally spaced dough batch side roller shaping means at said preshaping location to shape sides of said batch;

a pair of top and bottom roller preshaping and dough advancing means for preshaping said batch into a uniform hight and advancing said batch from between said said roller shaping means to a divider location;

dough divider means at said divider location for receiving said dough batch in a preshaped configuration, shaping it to a generally rectangular cross section strip of dough and advancing the strip to a cut-off location;

dough cut-off means at said cut-off location for dividing said strip into parts of determinable size, separating such parts in sequence from said strip and delivering them individually to a forming location;

dough forming means at said forming location for receiving said individual dough parts and forming them into a desired configuration;

sensor means for sensing the buildup of the dough batch between said top and bottom roller preshaping and dough advancing means and said dough divider means; means for varying the advancement of said dough batch by said advancing means in response to the amount of buildup of dough sensed by said sensor means, and means for operating said dough divider means in an intermittent dough advancing manner to advance said strip in an intermittent motion manner to said cut-off location.

18. The machine of claim 1 wherein said means for operating said dough divider means in an intermittent dough advancing manner comprises:

a one way advancement ratchet type rotary clutch means for operating said dough divider means; and a reciprocating lever arm operating said clutch means in a forward dough divider advancing mode and in a reverse ratcheting dough divider dwell mode; and means for varying the extent of movement of said lever arm for a given drive condition of said drive means whereby an incremental advancement of said dough divider and strip of dough may be adjusted to vary the length of dough parts being cut-off by said cut-off means.

19. The machine of claim 1 wherein said varying means comprises variable drive means are provided for operating said infeed conveyor and said top and bottom preshaping and dough advancing means at selectably varying speeds of dough batch advancement.

20. The machine of claim 1 wherein width dough batch side roller preshaping means comprise a pair of laterally spaced cylindrical rollers freely rotating about roller shafts which are normal to the path of batch movement from said conveyor.

21. The machine of claim 1 wherein said dough forming means includes a series of toroid forming segmented cups traveling on a cup chain run about horizontal axis and laterally spaced support drive sprockets relative a stationary mandrel with the cups in an open dough part receiving position prior to passing the mandrel, said machine further comprising:
a vertical chute positioned below said dough cut-off means and above said cups when in said open dough part receiving position whereby dough parts divided by said cut-off means from said dough strip fall virtually straight downwardly through said chute to said forming means open cups.

22. The machine of claim 21 wherein said vertical chute is provided with a removable dough engaging tab depending from said chute into a space in said dough forming means about which said open cups pass whereby a falling dough part may be selectively constrained into a desired landing position in said forming means and said tab may be easily removed for cleaning.

23. The machine of claim 1 wherein:
a first motor is provided for operating said variable drive means for said infeed conveyor and said top and bottom preshaping and said top and bottom roller preshaping and dough advancing means; and
a second motor and associated drive means are provided for operating all of said dough divider means, cut-off means and forming means by said second motor.

24. The machine of claim 23 wherein:
said associated drive means includes means for operating said dough divider means in an intermittent dough advancing mode whereby said stirp of dough at said cut-off location is intermittently stationary for a dough part cut-off from said strip.

25. The machine of claim 24 wherein:
said associated drive means includes means for continuously operating said cut-off means and forming means; and
said variable drive means for said infeed conveyor and dough advancing means includes means for continuously operating them, whereby
said dough batch is continuously fed from said conveyor past said side roller preshaping means and between said top and between roller preshaping and dough advancing means, intermittently advanced by said divider means, continously cut-off into dough parts by continuous operation of said cut-off means and said dough parts are continously formed into said desired configuration by said forming means by said forming means.

26. The machine of claim 1 wherein said dough forming means includes a series of torid forming cups run on a conveyor chain driven about horizontally spaced sprockets with a mandrel positioned to have said cups pass thereabout and further comprising:
a premandrel member having a generally planar and downwardly inclined leading undersurface merging into a rearward semi-tubular trailing body portion;
means for mounting said premandrel member relative said cups and said mandrel whereby received dough parts are carried by said cups under said premandrel for preshaping of said parts as they approach said mandrel.

27. The machine of claim 26 wherein:
a vertical strip of resilient material is provided forwardly of said premandrel in the path of travel of said dough parts to facilitate a timed and spaced passage of said dough parts beneath said premandrel.

28. The machine of claim 26 wherein said mounting means includes:
means for pivotally mounting said premandrel member for pivotal movement away from said cups to an inoperative position.

29. The machine of claim 28 wherein:
biasing means are provided for biasing said premandrel member about its pivotal mounting toward said inoperative position, said mounting means locating said premandrel member trailing body portion below leading portions of said mandrel to be normally held thereby against said biasing.

30. The machine of claim 1 wherein said dough forming means includes a series of articulated toroid forming segmented tubular cups on a drive chain run horizontally about spaced chain support and drive sprockets, camming means for moving the cup segments between a open dough position moving on the bottom chain lay below and between said sprockets and a closed toroid forming tubular position when moving on said top chain lay above and between said sprockets and a removable mandrel above the top chain lay about which the closed cups move to roll dough parts into toroidal shapes between said cups and mandrel and comprising:
means for selectively pivoting portions of said camming means away from an operative position to an inoperative position relative said cups whereby said cups remain in said open position when moving on said top chain lay when said camming means portions are in said inoperative position.

31. The machine of claim 30 wherein:
mandrel replacing dough forming means are provided for being located above said top chain lay in place of said removable mandrel when the latter is removed therefrom.

32. The machine of claim 31 wherein said mandrel replacing dough forming means comprises:
an inverted V-shaped longitudinally extending trough; and means for mounting it in vertically adjustable manner over said top chain lay on which said open cups are located to form dough parts therewith into dough ball configurations.

33. The machine of claim 32 wherein said mandrel replacing dough forming means further comprises:
a pair of longitudinally extending generally rectangular dough contacting plates, and
means for adjustably mounting each of said plates to an underside of one leg of said V-shaped trough whereby said trough and plates may be adjusted relative said cups to roll various size dough balls.

* * * * *